United States Patent
Lewis

(10) Patent No.: US 7,352,830 B2
(45) Date of Patent: Apr. 1, 2008

(54) SLIDING WINDOW

(75) Inventor: Michael Lewis, Märsta (SE)

(73) Assignee: Infineon Technologies AG, Munich (DE)

( * ) Notice: Subject to any disclaimer, the term of this patent is extended or adjusted under 35 U.S.C. 154(b) by 679 days.

(21) Appl. No.: 10/896,482

(22) Filed: Jul. 21, 2004

(65) Prior Publication Data
US 2005/0041762 A1 Feb. 24, 2005

(30) Foreign Application Priority Data
Aug. 18, 2003 (SE) .................................. 0302233

(51) Int. Cl.
*H03D 1/00* (2006.01)
(52) U.S. Cl. .................................. 375/343
(58) Field of Classification Search ................. 375/343
See application file for complete search history.

(56) References Cited

U.S. PATENT DOCUMENTS

| | | | |
|---|---|---|---|
| 6,075,807 A | 6/2000 | Warren et al. ............. 375/143 |
| 6,480,558 B1* | 11/2002 | Ottosson et al. ............ 375/350 |
| 6,549,594 B1* | 4/2003 | Chen et al. ................. 375/355 |
| 6,567,482 B1* | 5/2003 | Popovic' ..................... 375/343 |
| 7,103,084 B2 | 9/2006 | Jang et al. .................. 375/130 |
| 2003/0112743 A1* | 6/2003 | You et al. .................... 370/203 |
| 2004/0101068 A1* | 5/2004 | Wang et al. ................. 375/324 |
| 2005/0002361 A1* | 1/2005 | Dick et al. .................. 370/335 |
| 2007/0116103 A1* | 5/2007 | Atarius et al. .............. 375/148 |

FOREIGN PATENT DOCUMENTS

WO    WO 03/081827 A2    10/2003

* cited by examiner

*Primary Examiner*—David C. Payne
*Assistant Examiner*—Leon-Viet Q Nguyen
(74) *Attorney, Agent, or Firm*—Dicke, Billig & Czaja, PLLC

(57) ABSTRACT

In an apparatus and method for detecting a preamble in a message a shorter initial average is used to estimate the peak position peak symbol duration, and then the number of subsequent delay stages is reduced to 1 per symbol where the chosen peak position is stored along with the corresponding intermediate detection value. At the output, a weighting function is applied to eliminate detection values inconsistent with a symbol-spaced signal output.

18 Claims, 4 Drawing Sheets

SLIDING WINDOW

PRIORITY

This application claims priority to Swedish application no. 0302233-2 filed Aug. 18, 2003.

TECHNICAL FIELD OF THE INVENTION

The present invention relates to an apparatus and a method for detecting signals. More specifically, the present invention relates to an apparatus and a method for detecting signals using direct-sequence spread spectrum with short spreading codes, such as the length 11 Barker sequence of IEEE 802.11 b/g WLAN.

BACKGROUND OF THE INVENTION

In 802.11 standard-based WLAN receivers, as in many other receiver systems, an important task is to be able to reliably detect the start of transmissions within a given time. For the case of the 802.11 b/g standard the preamble portion of the transmission consists of a BPSK signal, e.g. +/−1 at baseband, transmitted at 1 Msymbol/s, modulated with a Barker spreading sequence consisting of an 11-chip sequence of +/−1 transmitted at 11 Mchips/s. An example of the transmitted sequence and how it can be generated is shown in FIG. 1.

The use of the 11-chip Barker sequence as a spreading code typically forms the basis for detecting the presence or absence of such a signal. The received signal is passed into a correlator block, which matches the received signal against the known Barker pattern. Due to the properties of the Barker code, the output signal of the correlator block will exhibit a peak in amplitude as the last chip of each input symbol arrives. The peaks have the same sign as the transmitted BPSK sequence, and are spaced in time with the symbol spacing time. In the times between peaks, the output has a low value. The detection algorithm searches for the presence of these peaks.

In the presence of noise, the difference between the peaks and the valley level at the output of the correlator becomes harder to distinguish. In order to make a reliable detection decision, it is necessary to take the output of the correlator and perform an average or a summation, the two differ only by a constant scaling factor, at a fixed position over a number of symbol periods.

There are intermediate signal processing steps that can be performed. However, the detection result must still, in general, be calculated by a combination of the values at peak positions over a number of symbols.

The difficulty is therefore to be able to determine where these peak positions are in order to calculate the appropriate detection output. If the output is taken at some other time, then it will not be possible to detect the wanted signal since the result will be the "noise" between the peaks.

A technique known in the prior art is to calculate the detection algorithm result over a sliding window. A generic example is given in FIG. 2. The received signal is passed through a number of signal processing stages 201, of which one is a Barker correlator 202, to generate a sequence of first correlation values. These values are passed to a delay line 203, with taps 204 at symbol intervals. In the example shown, the sampling rate is assumed to be 22 MHz meaning that each symbol interval involves 22 delay stages 205. A combiner 206 performs a combining function that generates the output. In a simple example, the Barker correlator 202 is followed by a calculation of the magnitude of the output of the signal processing function 201, and the combining function is simply the sum of the magnitudes at each tap.

The sliding-window method calculates a continuous result for a window of time stretching back from each new input sample. This means that signals starting at any point in time can be detected with equal chance of success. Since the detection block is also guaranteed to capture the whole sequence from the start to the end of the window period, it is possible to use more information about the properties of the sequence in the detection algorithm.

The flexibility of the sliding-window method comes however at significant hardware cost. In a typical IEEE 802.11b detection block, the detection period is 15 µs, implying up to 330 delay stages at a sampling rate of 22 MHz. Each delay stage will consist of a row of N storage elements, where N is the word width of the intermediate detection result. For instance, if an 8-bit representation is used for the intermediate result, the total number of flip-flops required is 2640; with each flip-flop corresponding in size to about 8 combinational gates, this is a gate-equivalent of 21 kgates, which is comparable in size to an ARM 7 processor.

SUMMARY OF THE INVENTION

It is a main object of the present invention to provide such apparatus and method that at least alleviate the above problems.

In general terms the present invention uses a shorter initial average to estimate the peak position per symbol duration, and then reduces the number of subsequent delay stages to 1 per symbol where the chosen peak position is stored along with the corresponding intermediate detection value. At the output, a weighting function is applied to eliminate detection values inconsistent with a symbol-spaced signal output.

These objects, among others are, according to a first aspect of the present invention, attained by an apparatus for detecting a preamble in a message wherein said preamble comprises symbols having a first transmission rate, $f_s$ and where each of said symbols is overlaid with a known binary sequence having a second transmission rate, $f_c$ and having low autocorrelation for lags other than zero. The apparatus comprises a first correlator arranged to correlate a received signal with said known binary sequence producing a sequence of first correlation values, wherein each of the correlation values indicates the correlation between said received signal and said known binary sequence.

The first correlation values will have a higher value for positions in the sequence, or stream, of first correlation values, or samples, where the sequence coincides with the known binary sequence, that is, once for each received symbol and at the end of the symbol.

The apparatus comprises a second correlator provided to receive said first correlation values from said first correlator and correlate said first correlation values with symbols producing a corresponding sequence of second correlator values indicating the correlation between said first correlation values and said symbols.

A high value of a second correlator value indicates high probability that the particular correlation value, or sample, is positioned at the position of the last sample in the symbol. The second correlator reduces measurement noise and indicates with good reliability the position in the sequence where a symbol is detected. The second correlator outputs each received first correlation value and a corresponding second correlation value.

The apparatus comprises a peak selector provided to receive the first and second correlation values and to select a correlation value from a received set of first correlation values having the largest corresponding second correlation value, producing a sequence of selected correlation values and a sequence of position values indicating the position of said selected correlation value in said set of first correlation values.

The peak selector groups the received first correlation values into sets and selects the correlation value in the set having the largest corresponding second correlation value. This selected correlation value has a high probability of representing a symbol position, or more correctly, the position in the sequence of first correlation value which is the last position for the known binary sequence, and thus represent a completely received symbol. The second correlator thus outputs one selected correlation value for each set of first correlation values and the position for the value in the set.

Finally, the apparatus comprises a third correlator provided to receive said selected correlation values and said position values and correlate said received selected correlation values with symbols in said preamble by weighting each selected correlation value depending on the relation between the position of said selected correlation value and the position of other selected correlation values, and combining said weighted selected correlation values to produce a result indicative of the detection of said preamble.

From the peak selector, the third correlator receives selected correlation values at the first transmission rate $f_s$, i.e. the symbol rate. The selected correlation values are weighted depending on the position of the selected correlation value compared to the position of a number of adjacent selected correlation values. The selected correlation values are thereafter combined to achieve a correlation between the preamble and the selected correlation values. A high value of this correlation indicates a detected preamble.

According to a preferred embodiment the second correlator comprises a number of delay stages wherein each of said delay stage is provided to delay the received signal with one symbol time $T_s=1/f_s$. The second correlator further comprises a combiner provided to receive a sample from each delay stage and combine said samples to form said sequence of second correlation values. The number of delay stages is a fraction of the number of symbols in said preamble.

According to a preferred embodiment the peak selector is provided to form, from said received first correlation values, a sequence of sets wherein each of said set comprises a number of first correlation values equal to the number of first correlation values, $N_{TS}$, received during one symbol time $T_s$. The peak selector is provided to select, from each of said sets, the correlation value having the largest corresponding second correlation value, and the peak selector is provided to produce said sequence of selected correlation values and said sequence of position values with said first transmission rate $f_s$.

Since the peak selector groups the received first correlation values in sets comprising the number of samples received during a symbol period and that the peak selector selects the largest value together with the position, no synchronisation is necessary, i.e. Tie border of the sets need not to coincide with the borders for the known digital sequence.

According to a preferred embodiment the position selector is provided to calculate a centre position value indicative of the most common position in the set of position values and to supply the centre position value to the weight means.

The weight means is provided to multiply each of the selected correlation values in the set of selected correlation values with a value inversely related to the difference between the corresponding position value and the centre position value.

The value proportional to the difference between the corresponding position value and the centre position value may for instance be calculated by counting the minimum number of positions between said centre position and said corresponding position value, wherein the maximum and minimum positions are regarded to be neighbouring positions and setting said value to be inversely related to the number of positions.

That is, if the set comprises 22 samples, or correlation values, and that said samples have positions 0 to 21, and if the centre position value is 21, a position value of 19 is 2 positions distant from the centre position value as is the position value 1.

According to a preferred embodiment the known binary sequence is a Barker sequence.

According to a preferred embodiment the combiner is provided to combine said samples by adding the absolute values of said samples.

The centre position value may for instance be calculated by averaging all position values in said set of position values, or by taking the most common position value in said set of position values.

The message may for instance be a message according to the WLAN standard IEEE 802.11.

The above objects among others are, according to a second aspect of the present invention, attained by a method for detecting a preamble in a message wherein the preamble comprises symbols having a first transmission rate, $f_s$, each of the symbols is overlaid with a known binary sequence having a second transmission rate, $f_c$, and having low autocorrelation for lags other than zero. The method comprises the step of correlating a received signal with said known binary sequence to produce a sequence of first correlation values wherein each of said correlation values indicates the amount of correlation between said received signal and said known binary sequence.

The method further comprises the step of correlating the first correlation values with a fraction of the symbols in the preamble to produce a corresponding sequence of second correlation values indicating the correlation between the first correlation values and the fraction of symbols.

A sequence of arrays is formed, wherein each of the arrays comprises a number of first correlation values, and wherein the number of first correlation values is equal to the number of first correlation values received during a symbol time $T_s$.

The first correlation value, having the largest corresponding second correlation value, is selected from each of the arrays and a sequence of selected correlation values is formed from said selected first correlation values. A sequence of position values is formed, wherein each of said position value is the position for a corresponding selected correlation value in said array of first correlation values.

For each selected correlation value and corresponding position value in the sequence of selected correlation values and sequence of position values, the method performs the steps a) to e) below.

a) a set S of N subsequent selected correlation values and N position values is formed, b) a centre position value is calculated from said N position values, c) a weight value for each position value in said set S is calculated, wherein said weight value is inversely related to the minimum distance between said position value and said centre position value and where said distance is calculated in a circular manner so that the maximum position value is regarded to be next to the minimum position value, to form N weight values, d) each of said selected correlation values is multiplied with the corresponding weight value, and e) said N weighted selected correlation values are combined to form a value indicating the correlation between said received signal and said preamble.

An advantage according to a preferred embodiment of the invention is a dramatic reduction in the storage requirements of the Barker detect function, while permitting all most commonly used detection algorithms to be performed.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 4, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
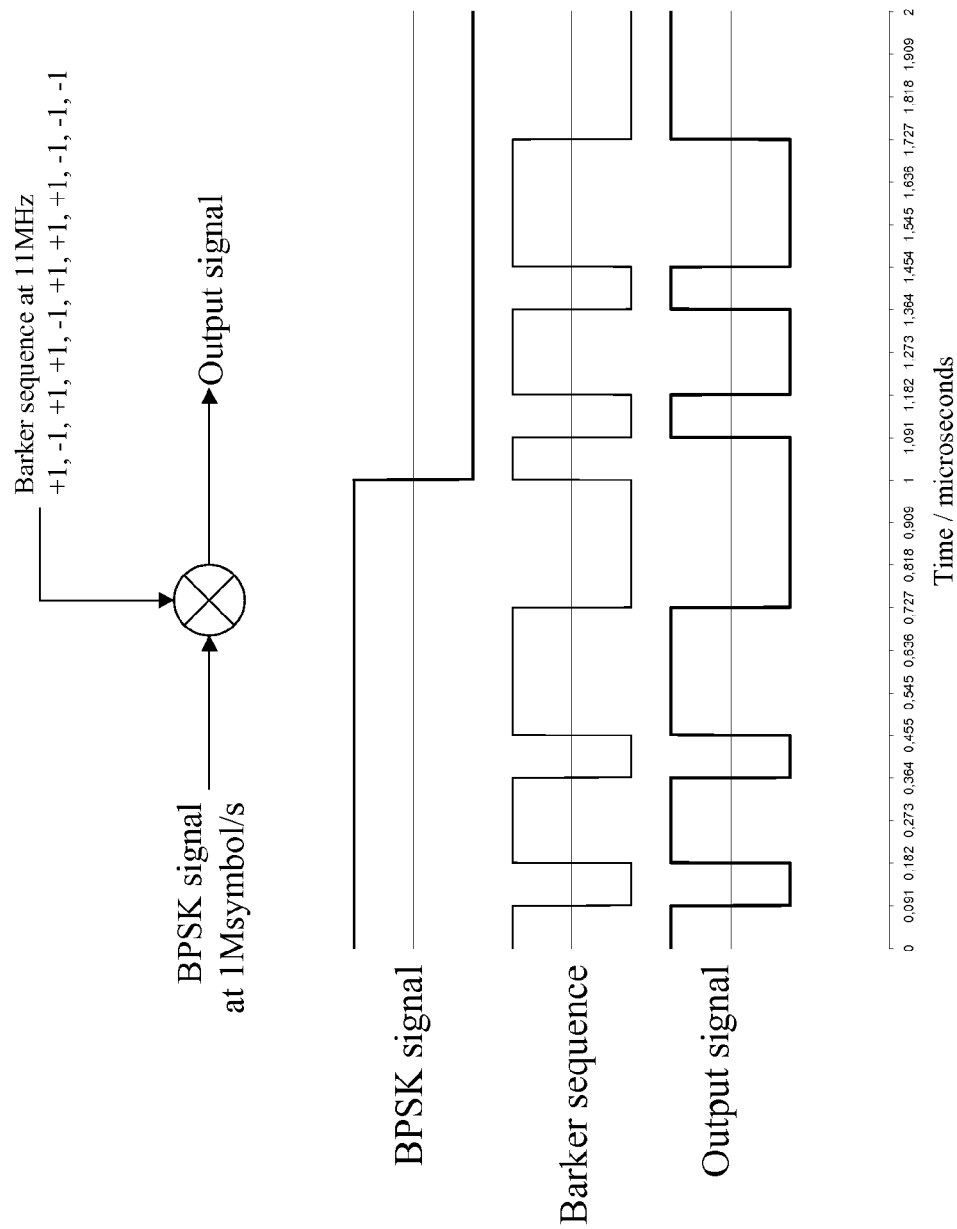
FIG. 1 is a schematic block diagram of overlaying a binary phase shift key (BPSK) signal with a Barker sequence according to prior art.
Figure 2:
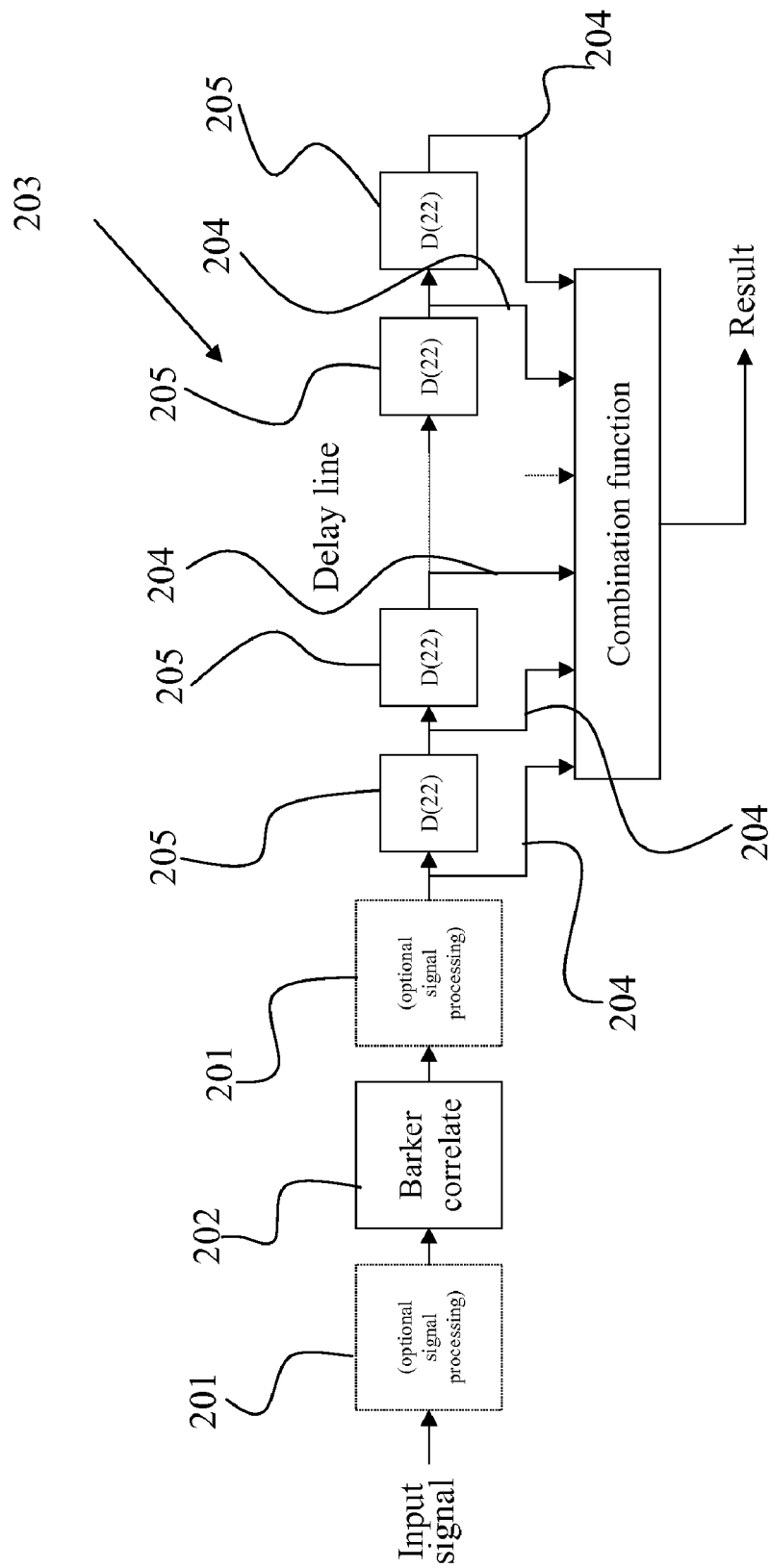
FIG. 2 is a schematic block diagram of a detection circuit according to the prior art.

FIGS. 1 and 2 has been briefly discussed in the background and will not further be dealt with.

Figure 3:
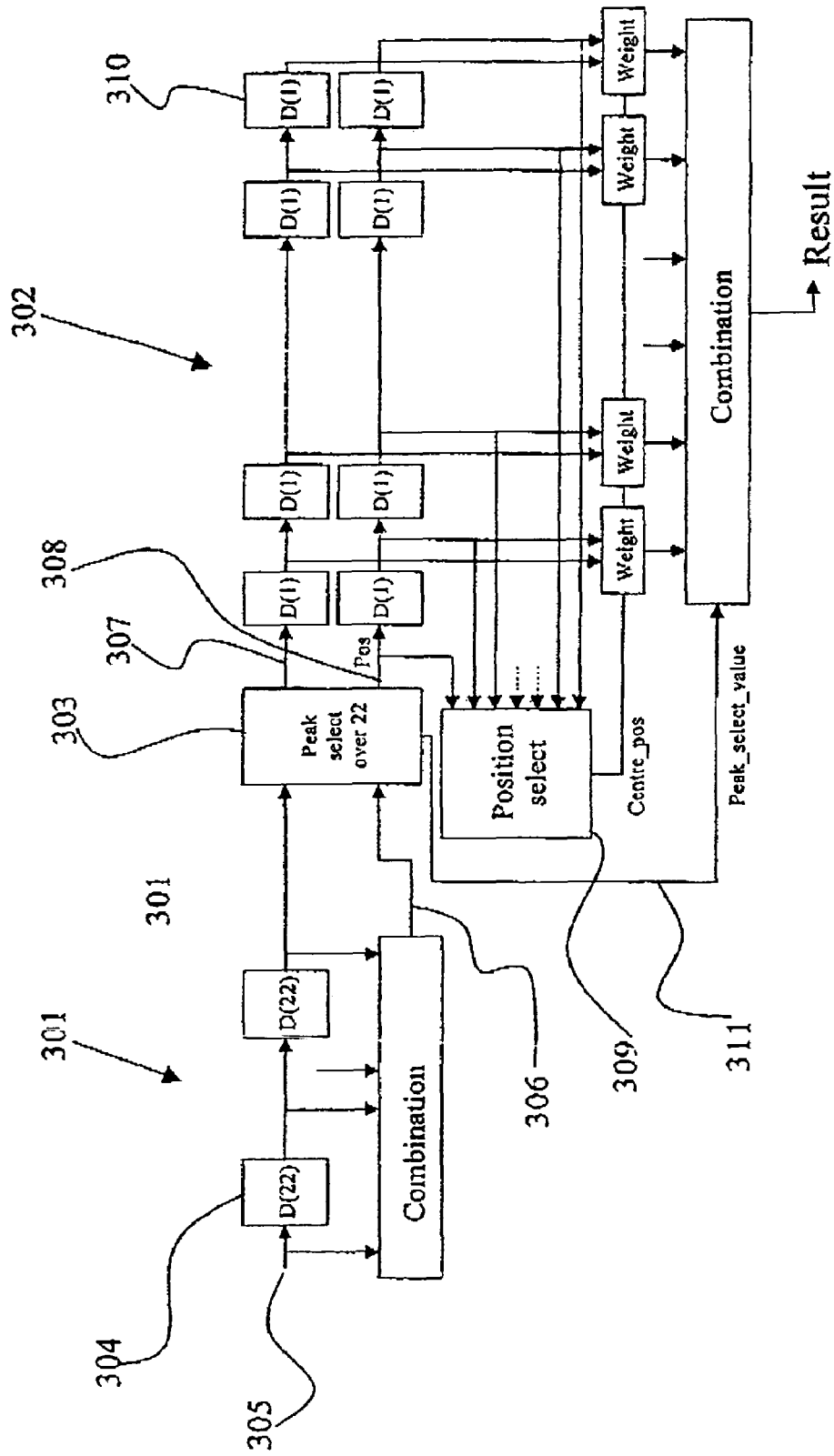
FIG. 3 is a schematic block diagram according to a preferred embodiment of the invention.

An apparatus according to a preferred embodiment of the invention is shown in FIG. 3. The apparatus comprises a second correlator 301 and a third correlator 302. The first correlator is the Barker correlator 202 shown in FIG. 2. The apparatus further comprises a Peak selector 303.

The second correlator 301, comprising a number of delay stages 304, receives a sequence of first correlation values 305 from the first correlator 202. Each delay stage 304 can store all samples, or, more precisely, the values after correlating the received samples with the Barker sequence, received during a symbol time $T_s$.

In the present embodiment of the invention, the received signal is expected to be transmitted with a frequency $f_s=1$ MHz, i.e. each symbol in the signal is $T_s=1$ μs long, where $T_s$ is the symbol time. Each symbol is overlaid with a Barker sequence having a frequency of 11 MHz and at the receiver end the signal is sampled with 22 MHz. This is in accordance with the WLAN standard IEEE 802.11 and typical receiver implementations. Thus, each delay stage 304 must store 22 values.

In the second correlator 301, a symbol-spaced averaging process is performed similar to that done in the conventional sliding window design. However, this process is only performed over a small number of symbols, in this embodiment 4, with only two shown in FIG. 2. In other embodiments fewer or more delay stages may de utilised. The averaging/summation process reduces measurement noise, producing a sequence of second correlation values 306 from which it is possible to distinguish the peak value with good reliability.

Figure 4A:
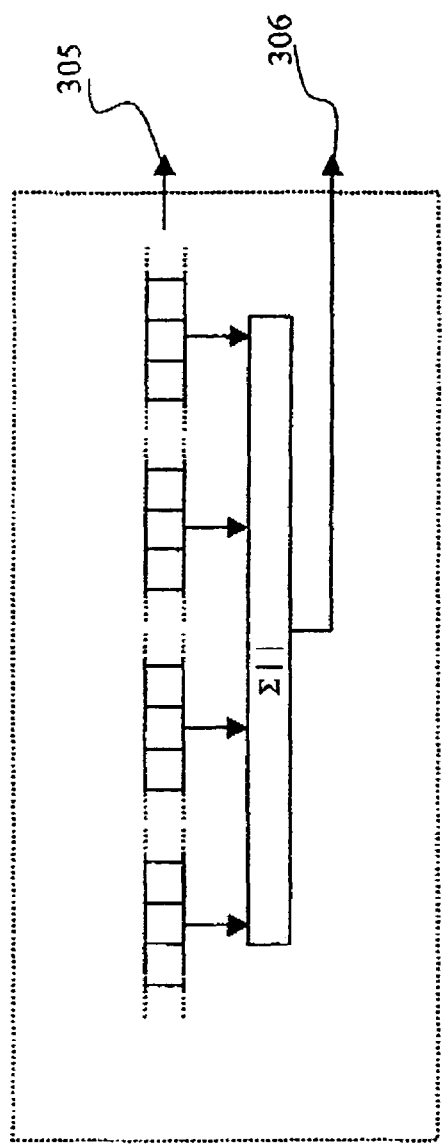
FIG. 4a and 4b are schematic block diagrams detailing handling of received samples according to a preferred embodiment of the invention shown in FIG. 3.

In FIG. 4a tapping of the sequence of first correlation values to form a sequence of second correlation values is illustrated.

Returning to FIG. 3, the peak selector 303 groups the received first correlation values into successive sets of 22 values. At the end of each successive set, the peak selector 303 passes the first correlation value corresponding to the peak of the second correlation value 307 to the third correlator 302. The peak selector 303 also passes the index, or position, corresponding to the position in the set of 22 values where the peak was taken from 308, to the third correlator 302.

Figure 4B:
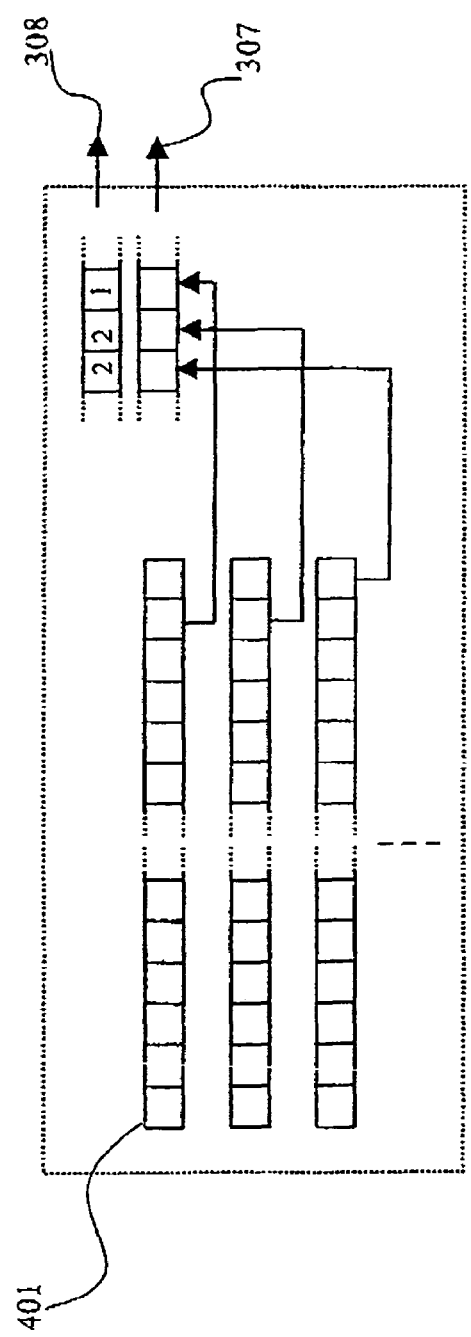

In FIG. 4b forming of the sets 401, the sequence of selected correlation values 307 and the corresponding position values 308 is illustrated.

In the presence of a signal, the peak values are therefore picked out and can be used to form the final result. In the case that the combination function for the second correlator is the same as that for the third correlator the peak second correlation value can simply be combined 311 with the other results to calculate the final result, as is shown in FIG. 3. In the absence of a signal, i.e. when only noise exists on the input, random samples from within each symbol period will have the highest second correlation value.

The third correlator comprises a number of delay stages 310. In the case of IEEE 802.11 b/g the preamble must be detected during a 15 μs interval, equal to 15 symbols. Nearly 1 symbol was used in the first correlator, 4 symbols were used in the second correlator, so the third correlator comprises 10 delay stages. Since only one value is selected by the peak selector 303 for each received symbol, each delay stage 310 in the third correlator need only to store two values, one selected correlation value and one position value, for each symbol, rather than 22 values as was required in the second correlator and in the prior art.

The peak selection process would, were it the only mechanism used, produce an unacceptably high probability of false alarm since the peak value over 22 samples of noise is clearly much larger on average than a single value. In the absence of a signal, the incoming signal is random and the position of the peak value will also be random. This property can be used to counteract the effect at the peak selection.

The position values passed to the third correlator 302 are passed to the position select block 309. The position select block 309 calculates the most likely true symbol position, the centre position, based on the position values in the third correlator 302, by e.g. taking the most common value or taking the arithmetic average. For each selected correlation value in the third correlator; the corresponding position value is compared with the centre position value and the selected correlation value is scaled according to a weighting function that causes values where the position value is further away from the centre position value to be reduced in amplitude. The difference in position should be calculated in a circular fashion across symbol boundaries, e.g. in a 22

MHz system with 22 samples per symbol indexed from 0 to 21, sample 0 is adjacent to both sample 1 and 21. An example of a simple weighting function is a weight=1 if the position value and the centre position value are within a constant separation, and a weight=0 if they have a larger separation. This constant separation should be chosen such that fluctuations in the position value due to noise and multipath distortion do not excessively reduce detection probability, while maintaining a sufficiently low false alarm rate.

The implementation described above is only an example. It may be desirable to use a different signal processing function to determine the optimum peak position than the algorithm used to calculate the Barker detect output, or to perform a number of other functions on data at various locations. The key point is the use of a peak detection function over a limited period of time to avoid the requirement to store all samples of the signal for the time duration covered by the algorithm.

It will be obvious that the invention may be varied in a plurality of ways.

For instance may the invention be applied to any system where a signal must be detected using an algorithm that is performed on only the peaks of a signal with a regularly repeating peak, where the peak position is not known a-priori.

Such variations are not to be regarded as a departure from the scope of the invention. All such modifications as would be obvious to one skilled in the art are intended to be included within the scope of the appended claims.

The invention claimed is:

1. An apparatus for detecting a preamble in a message, wherein said preamble comprises symbols having a first transmission rate, $f_s$, each of said symbols is overlaid with a known binary sequence having a second transmission rate, $f_c$, and having low autocorrelation for lags other than zero, said apparatus comprises:
    a first correlator arranged to correlate a received signal with said known binary sequence producing a sequence of first correlation values, wherein each of said correlation values indicates that correlation between said received signal and said known binary sequence,
    a second correlator provided to receive said first correlation values from said first correlator and correlate said first correlation values with said symbols producing a corresponding sequence of second correlator values indicating the correlation between said first correlation values and said symbols,
    a peak selector provided to receive said first and second correlation values and to select a correlation value form a received set of first correlation values having the largest corresponding second correlation value producing a sequence of selected correlation values and a sequence of position values indicating the position of said selected correlation value in said set of first correlation values, and
    a third correlator provided to receive said selected correlation values and said position values and correlate said received selected correlation values with symbols in said preamble by weighting each selected correlation value depending on the relation between the position of said selected correlation value and the position of other selected correlation values, and combining said weighted selected correlation values to produce a result indicative of the detection of said preamble.

2. The apparatus according to claim 1, wherein
    said second correlator comprises a number of delay stages wherein each of said delay stages is provided to delay said received signal with one symbol time $T_s=1/f_s$,
    said second correlator comprises a combiner provided to receive a sample from each delay stage and combine said samples, to form said sequence of second correlation values, and
    said number of delay stages is a fraction of the number of symbols in said preamble.

3. The apparatus according to claim 1, wherein
    said peak selector is provided to form, from said received first correlation values, a sequence of sets wherein each of said set comprises a number of first correlation values equal to the number of first correlation values, $N_{TS}$, received during one Symbol time $T_S$,
    said peak selector is provided to select, from each of said set, the correlation value having the largest corresponding second correlation value, and
    said peak selector is provided to produce said sequence of selected correlation values and said sequence of position values with said first transmission rate $f_s$.

4. The apparatus according to claim 1, wherein
    said third correlator is provided to supply a set of said selected correlation values to weight means,
    said third correlator is provided to supply a corresponding set of position values to said weight means and to a position selector,
    said position selector is provided to calculate a centre position value indicative of the most common position in said set or position values and to supply said centre position value to said weight means,
    said weight means is provided to multiply each of said selected correlation values in said set of selected correlation values with a value inversely related to the difference between the corresponding position value and said centre position value, and
    said third correlator comprises a combiner provided to combine each of said weighted selected correlation values to form a result indicative of the correlation between said received signal and said preamble.

5. The apparatus according to claim 4, wherein
    said weight means is provided to calculate said value inversely related to the difference between the corresponding position value and said centre position value by counting the minimum number of positions between said centre position and said corresponding position value, wherein the maximum and minimum positions are regarded to be neighbouring positions and setting said value to be inversely related to the number of positions.

6. The apparatus according to claim 1, wherein said known binary sequence is a Barker sequence.

7. The apparatus according to claim 2, wherein said combiner is provided to combine said samples by adding the absolute values of said samples.

8. The apparatus according to claim 4, wherein said position selector is provided to calculate said centre position value by averaging all position values in said set of position values, or by taking the most common position value in said set of position values, as the centre position value.

9. The apparatus according to claim 4, wherein said combiner is provided to combine said samples by adding the absolute values of said samples.

10. The apparatus according to claim 4, wherein said message is a message according to IEEE 802 11.

11. The apparatus according to claim 5, wherein said value is 1 if said number of positions between said position value and said Centre value is less than a threshold value and 0 otherwise.

12. A method for detecting a preamble in a message wherein said preamble comprises symbols having a first transmission rate, $f_s$, each of said symbols is overlaid with a known binary sequence having a second transmission rate, $f_c$ and having low autocorrelation for lags other than zero, comprising the steps of:
  correlating a received signal with said known binary sequence to produce a sequence of first correlation values wherein each of said correlation value indicates the amount of correlation between said received signal and said known binary sequence,
  correlating said first correlation values with a fraction of the symbols in said preamble to produce a corresponding sequence of second correlation values indicating the correlation between said first correlation values and said symbols,
  forming a sequence of arrays wherein each of said array comprises a number of said first correlation values, and wherein said number of said first correlation values is equal to the number of first correlation values received during a symbol time $T_s$,
  selecting the first correlation value from each of said of arrays having the largest corresponding second correlation value,
  forming a sequence of selected correlation values from said selected first correlation values,
  forming a sequence of position values wherein each of said position value is the position for a corresponding selected correlation value in said array of first correlation values, and
  for each selected correlation value and corresponding position value in said sequence of selected correlation values and sequence of position values performing:
    a) forming a set S of N subsequent selected correlation values and N position values,
    b) calculating a centre position value from said N position values,
    c) calculating a weight value for each position value in said set S wherein said weight value is inversely related to the minimum distance between said position value and said centre position value and where said distance is calculated in a circular manner so that the maximum position value is regarded to be next to the minimum position value, to form N weight values,
    d) multiplying each of said selected correlation values with a corresponding weight value,
    e) combining said N weighted selected correlation values to form a value indicating the correlation between said received signal and said preamble.

13. The method according to claim 12, wherein said step of correlating said first correlation values with a fraction of the symbols in said preamble is performed by, for each value in said sequence of first correlation values, adding the absolute value of a number of first correlation values, wherein said number of first correlation are values spaced apart by a symbol time $T_s=1/f_s$.

14. The method according to claim 12, wherein said step of calculating a centre position value is performed by taking the average position value of said N position values, or taking the most common position value from said N positions values, as the centre position value.

15. The method according to claim 12, wherein said step of combining said N weighted selected correlation values is performed by adding the absolute value of said weighted selected correlation values, or multiplying each of said N weighted selected correlation values with a corresponding symbol sign and then adding said weighted selected correlation values.

16. The method according to claim 12, wherein said fraction of symbols is four and said number N is ten.

17. The method according to claim 12, wherein said known binary sequence is a Barker sequence.

18. The method according to claim 12, wherein said message is a message according to IEEE 802.11.

* * * * *